(12) United States Patent
Murphy et al.

(10) Patent No.: US 6,987,847 B1
(45) Date of Patent: Jan. 17, 2006

(54) COMMUNICATION DEVICE MONITORING

(75) Inventors: Stephen Vaughan Murphy, Halifax (CA); William P. McMullin, Bedford (CA); Roberto J. Devoto, Arlington, VA (US)

(73) Assignee: America Online, Inc., Dulles, VA (US)

( * ) Notice: Subject to any disclaimer, the term of this patent is extended or adjusted under 35 U.S.C. 154(b) by 237 days.

(21) Appl. No.: 10/414,167

(22) Filed: Apr. 15, 2003

(51) Int. Cl.
H04M 3/42 (2006.01)

(52) U.S. Cl. .................................. 379/201.1

(58) Field of Classification Search .......... 379/201.06, 379/201.07, 201.09, 201.1, 207.12, 913
See application file for complete search history.

(56) References Cited

U.S. PATENT DOCUMENTS

| | | | |
|---|---|---|---|
| 4,995,074 A * | 2/1991 | Goldman et al. | 379/93.35 |
| 5,099,346 A * | 3/1992 | Lee et al. | 398/118 |
| 5,197,092 A * | 3/1993 | Bamburak | 379/211.05 |
| 5,455,851 A * | 10/1995 | Chaco et al. | 379/38 |
| 5,684,868 A | 11/1997 | Alexander | |
| 5,703,941 A * | 12/1997 | Nakajima et al. | 379/201.01 |
| 5,809,128 A * | 9/1998 | McMullin | 379/215.01 |
| 6,301,609 B1 | 10/2001 | Aravamudan et al. | |
| 6,377,668 B1 * | 4/2002 | Smock et al. | 379/142.08 |
| 6,430,289 B1 | 8/2002 | Liffick | |
| 6,700,966 B2 * | 3/2004 | Takagi et al. | 379/201.06 |
| 2002/0034289 A1 * | 3/2002 | Pershan | 379/207.02 |

FOREIGN PATENT DOCUMENTS

EP 1 071 295 A2 * 1/2001

OTHER PUBLICATIONS

Rochelle Communications, Inc., Caller ID Business Solutions, Model ANI-232 Product Overview, Dec. 27, 2002; http://www.rochellecti.com/pani232a.php, 1 page.

Openwave Systems Inc., "Openwave™ Unified Messaging," Part No.: DSUM-R1-004, Oct. 2001, 2 pages.

* cited by examiner

*Primary Examiner*—Bing Q. Bui
(74) *Attorney, Agent, or Firm*—Fish & Richardson P.C.

(57) ABSTRACT

Monitoring user availability to perceive communications received across a network includes determining the existence of activity at a first communication device and accessing a presence rule record storing presence rule data relating the determined existence of activity at the first communication device to an availability of an intended recipient to perceive communications over a second communication device. The presence rule data is applied to the determined existence of activity to assess the availability of the intended recipient to perceive communications over the second communication device. Other entities are informed of the assessed availability of the intended recipient to perceive communications over the second communication device.

50 Claims, 10 Drawing Sheets

COMMUNICATION DEVICE MONITORING

TECHNICAL FIELD

This description relates to monitoring user availability to perceive communications.

BACKGROUND

Advances in network technologies and consumer premise equipment have increased the number of avenues of communication between users. Users are now able to communicate with each other over a number of different networks (e.g., the Internet, the public switched telephone network (PSTN), and Local Area Networks(LANs)) using a variety of different communication devices (e.g., personal digital assistants (PDAs), cell phones, personal computers, and landline phones).

SUMMARY

In one general aspect, monitoring user availability to perceive communications received across a network includes determining the existence of activity at a first communication device and accessing a presence rule record storing presence rule data relating the determined existence of activity at the first communication device to an availability of an intended recipient to perceive communications over a second communication device. The presence rule data is applied to the determined existence of activity to assess the availability of the intended recipient to perceive communications over the second communication device. Other entities are informed of the assessed availability of the intended recipient to perceive communications over the second communication device.

Implementations may include one or more of the following features. For example, the first communication device or the second communication device may include one of a personal computer, a personal digital assistant, a landline phone, and a wireless phone. The other entities may include other users.

Determining the existence of activity may include determining the state of the first communication device from among a set of device states. The set of device states may include the first communication device being connected to the network and in use and the first communication device being connected to the network and not in use.

The first communication device being connected to the network and in use may include the first communication device being connected to the network and interaction with a user interface of the first communication device. The interaction with the user interface of the first communication device may include depression or selection of keys or buttons associated with elements in the user interface or may include interaction with a portion of the user interface related to communications. The first communication device being connected to the network and in use may include the first communication device being connected to the network and communicating with other entities over the first communication device.

The first communication device may be a landline phone and determining the state of the landline phone may include determining the state based on a voltage signal of a phone line. Determining the state of the landline phone from among a set of device states may include determining the state to be the landline phone connected to the network and in use by the first user if the voltage signal corresponds to the landline phone being off-hook. Determining the state of the landline phone from among a set of device states may include determining the state to be the landline phone being connected to the network and not in use by the first user if the voltage signal corresponds to the phone being on-hook. The second communication device may be physically or communicatively linked to the first communication device and may be in close physical proximity to the first communication device.

Applying presence rule data may include relating the state of the first communication device to the availability of the intended recipient to perceive communications over the first communication device. Others entities may be informed of the assessed availability of the first communication device to accommodate communications perceivable by the intended recipient.

The presence rule data may include data specified by the intended recipient relating the state of the first communication device to the availability of the intended recipient to perceive communications over a second communication device. The presence rule data may include data inferred based on knowledge related to the physical proximity between the first communication device and the second communication device and may include data inferred based on communication device usage patterns of the intended recipient. The presence rule data also may include data used to change the availability of the intended recipient to perceive communications from another entity based on the identity of the other entity.

In another general aspect, a communications system includes a presence server configured to receive from a device monitor data related to the existence of activity at a first communication device and access a presence rule record storing presence rule data relating the received data to the availability of an intended recipient to perceive communications over a second communication device. The presence server is also configured to apply presence rule data to the received data to assess the availability of the intended recipient to perceive communications over the second communication device and inform other entities of the assessed availability of the intended recipient to perceive communications over the second communication device.

Implementations may include one or more of the following features. For example, the presence server may be further configured to send the assessed availability to a monitoring client system.

In another general aspect, a user interface includes a first interface element that identifies a user of interest and a second interface element that enables perception of the availability of the user of interest to perceive communications over a second communication device based on a determined existence of activity at a first communication device.

Implementations may include one or more of the following features. For example, the first interface element may identify a user of interest specified by a party to whom the user interface is provided. The first interface element may include text that identifies the user of interest. The communication devices may include at least one of a personal computer, a personal digital assistant, a wireless phone, and a landline phone.

The second interface element may include a set of graphical elements. Each of the graphical elements may correspond to a communication device and may be visually distinguishable based on a state of the corresponding communication device. The set may include a graphical element corresponding to the second communication device and a graphical element corresponding to the first communication device. The set may include a graphical element corresponding to communication devices over which the user of interest may perceive communications from the second user.

The set of graphical elements may include icons corresponding to the type of communication device. The set of graphical elements may include an icon corresponding to a landline phone and an icon corresponding to a personal computer.

A subset of the set of graphical elements may be graphically distinguishable from the set. The subset may include graphical elements that correspond to the communication devices over which the user of interest may perceive communications from the second user.

The second interface element may include a first set of graphical elements and one or more graphical elements selected from a second set of graphical elements. Each element in the first set of graphical elements corresponds to a communication device, and each element in the second set of graphical elements corresponds to a state of the one or more communication devices. The graphical elements of the second set may be overlaid on the graphical elements of the first set to indicate the state of the communication device corresponding to each graphical element of the first set.

The details of one or more implementations are set forth in the accompanying drawings and the description below. Other features will be apparent from the description and drawings, and from the claims.

DETAILED DESCRIPTION

A presence detection system is configured to determine the availability of a user of a monitored client system to perceive communications over a number of different communication devices. The monitored client system periodically sends communication device status data to the presence detection system. The presence detection system determines user communication availability by processing the communication device status data based on a set of presence rules that relate the communication device status data to the availability of the monitored user to perceive communications over different communication devices. The presence detection system sends to one or more monitoring client systems the communication device status data and the user communication availability data. The monitoring client systems enable a monitoring user to perceive the communication device status data and the user communication availability data.

Figure 1:
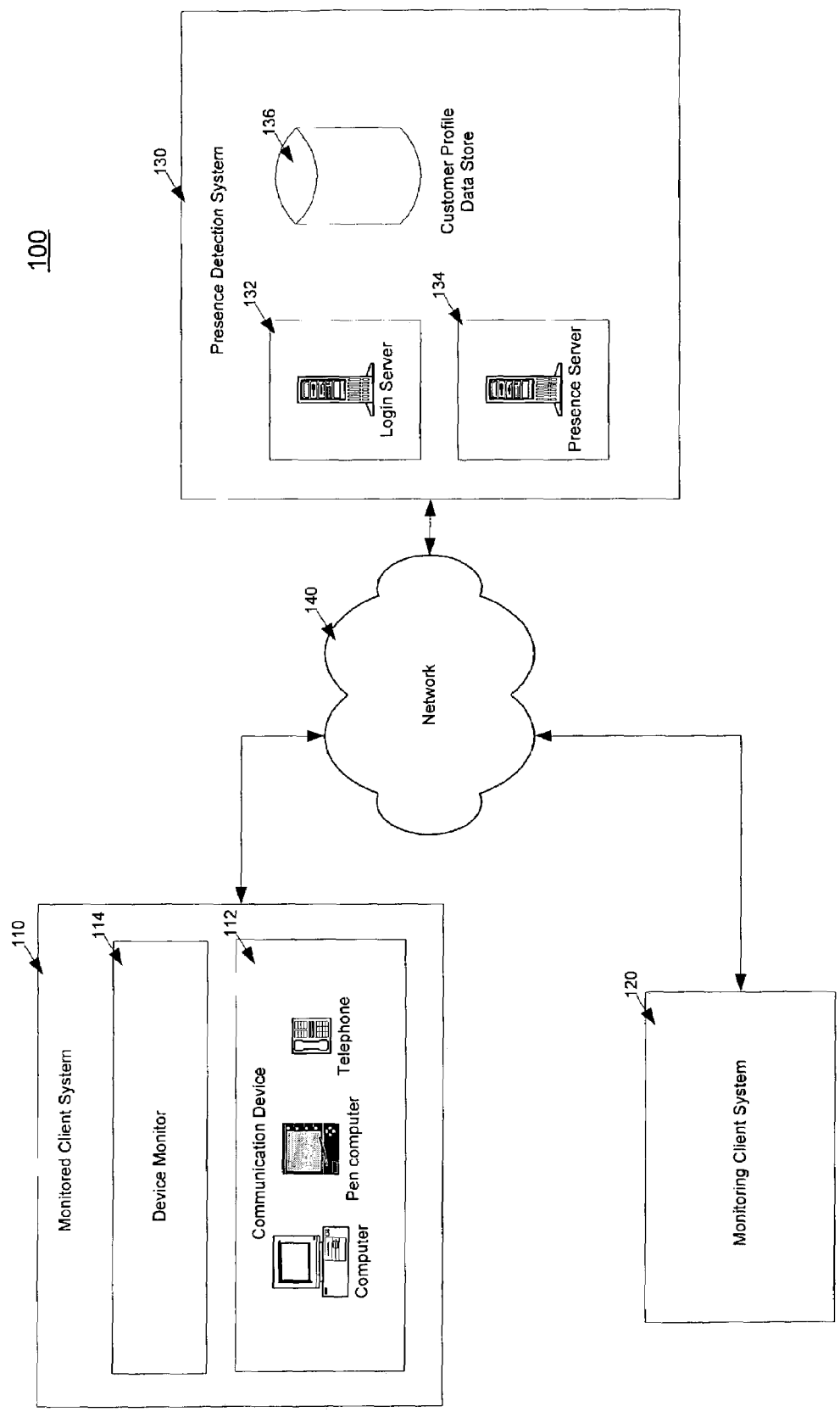
FIG. 1 is a block diagram of a communications system for monitoring communication device status and user availability to perceive communications.

Referring to FIG. 1, a communications system 100 for monitoring communication device status and user availability to perceive communications includes a monitored client system 110, a monitoring client system 120, a presence detection system 130, and a network 140. The monitored client system 110, the monitoring client system 120, and the presence detection system 130 communicate with each other over the network 140. In particular, the monitored client system 110 periodically sends communication device status data to the presence detection system 130.

The presence detection system 130 is configured to determine the availability of a user of the monitored client system to perceive communications through different communication devices. The system 130 receives communication device status data and processes that data to determine user communication availability data, which reflects the availability of the user to perceive communications through one or more communication devices. The user communication availability data is determined by processing the communication device status data in accordance with a set of presence rules that relate the communication device status data to the availability of the monitored user to perceive communications through different communication devices. The presence rules are specified by, or otherwise tailored to, the user of the monitored client system 110. The presence detection system 130 provides the monitoring client system 120 with access to the user communication availability data and/or the communication device status data.

The monitored client system 110 includes one or more communication devices 112 and one or more device monitors 114. The communication devices 112 are configured to allow a user of the monitored client system 110 to communicate with other users of client systems over the network 140. The communication devices 112 may include one or more of the following: a personal computer, a personal digital assistant (PDA), a landline phone, a mobile or wireless phone, or any other general or special purpose computing device, system or software capable of executing instructions in a defined manner to allow exchange of communications between the user of the monitored client system 110 and other users over the network 140.

The communication devices 112 may be in one of three states at any given time: (1) connected to the network 140 and being used by a user, (2) connected to the network 140 and not being used by a user, and (3) not connected to the network 140. In one implementation, the communication device 112 is "connected" to the network 140 when the communication device is "physically" connected to the network. In another implementation, the communication device 112 is "connected" to the network 140 when the communication device is "physically" and "logically" connected to the network 140.

A communication device 112 is physically connected to the network 140 when the communication device 112 is physically connected to an access line to the network 140 (e.g., when a patch cable of the communication device is physically connected to a network cable in the wall through a wall jack). A physical connection implies an electrical connection and is formed when the device transitions from an isolated device to a networked device. A physical connection does not depend upon the type of communications (e.g., e-mail, instant message, or voice data) sent across the network 140 or the communication application used to send communications across the network 140 nor upon the existence or lack thereof of a login/authentication by a user into any particular application, device, server, or system.

In contrast, a logical connection is a connection to the network 140 that requires an initial communication exchange across the network 140 between the communication device 112 and another entity to set up a communication channel. This initial communication exchange is typically a logging in process or similar authentication or identification process that enables a communication channel to be opened. Logical connections are communications application specific. For example, a logical connection to send e-mails or instant messages across network 140 may be setup by the logging in process to an Instant Messaging (IM) system or to an e-mail system. A physical connection is necessary before a logical connection may be set up.

A communication device 112 is "used" by a user when the user interacts generally with the monitored client system 110 or more specifically with a user interface of the communication device 112. For example, general user interactions with the monitored client system 110 that implicate use of communication device 112 include user movement of a mouse or user entry of keystrokes on the keyboard of a personal computer, depression of numbers on the number pad of a phone, or "writing" using a stylus on the screen of a PDA. In another implementation, a communication device 112 is "used" only when a user interacts with specific parts of the user interface of the communication device 112 (e.g., presses communication-related keys or buttons) or when a user is actually communicating with others using the communication device 112.

The device monitor 114 is configured to communicate or otherwise interact with one or more of the communication devices 112 to determine the state of the one or more communication devices 112 and to send communication device status data to the presence detection system 130. The device monitor 114 may be a general or special purpose computer, processor, or application specific integrated circuit (ASIC) capable of determining the state of a communication device and sending communication device status data to the presence detection system 130 over network 140. The device monitor 114 may be embedded in or integral to the communication device 112 or, alternatively, may be a separate stand-alone device communicatively coupled to the communication device 112. A single device monitor 114 may monitor multiple communication devices 112 or a separate device monitor 114 may be provided for each device 112.

In a hardware-focused implementation, the device monitor 114 may determine the state of a communication device by directly monitoring the hardware related to the communication device 112 (e.g., the electronics of the communication device or the physical communication medium connected to the communication device). The device monitor 114 is configured to monitor one or more status signals of a communication device 112 to determine the device state. A status signal is an electrical or optical signal that is placed in one or more known states that correlate to one or more device states and that may be electrically or optically monitored by the device monitor 114. In some implementations, the status signal is the communication signal itself (e.g., the phone line signal for landline phones).

For example, a status signal may be a voltage signal that is floating (i.e., not set at a specific voltage) when the communication device 112 is off (i.e., not receiving power) and, thus, not connected to the network 140. As another example, the status signal may be a voltage signal set at a first voltage level when the communication device 112 is on (i.e., receiving power) but not connected to the network 140; a second voltage level when the communication device 112 is on, connected to the network 140 but not being used; and a fluctuating voltage level within a known range when the communication device 112 is on, connected to the network 140, and being used. The device monitor 114 electrically monitors these voltage signals, relates the different voltage levels to device states, and sends corresponding communication device status data to the presence detection system 130.

In a software-focused implementation, the device monitor 114 is configured to determine the state of the communication device 112 by interacting with or modifying the communication device software running or otherwise directing the operations of the communication device 112. A device monitor 114 that receives or otherwise accesses device status data through modifications or interactions with the communication device software is typically able to access a wide variety of communication device states. For example, the communication device software may keep track of data regarding the state of the connection of the communication device 112 to the network 140 and the use of the communication device 112 by a user, as well as data regarding the type of communications sent by the user using the communication device 112 (e.g., when the communication device is a personal computer, the type of communications may be faxes, e-mails, or instant messages). In some implementations, the device monitor 114 is a software modification or plug-in to the communication device software of the communication device 112 that directs the communication device 112 to periodically send communication device status data to the presence detection system 130.

The communication device status data sent by the device monitor 114 includes the state of the communication device 112, a user identifier, a communication device identifier, and, in some implementations, user authentication data. The user identifier identifies the user of the communication device 112 and may be determined by user input during the initial configuration of the device monitor 114. Alternatively or additionally, the device monitor 114 may automatically determine the user identity by interacting with the communication device 112, interacting with another computer capable of providing user identity data, or accessing a user identity data store. The user identifier may be, for example, an Internet Protocol (IP) address or a screen name.

The communication device identifier includes the communication device name (e.g., "computer-in-bedroom", "RicksCellPhone", "Office-phone") and, in some implementations, may further include the type of communication device (e.g., landline phone, wireless phone, PDA, or personal computer). The communication device name and/or the type of communication device may be determined by user input during the initial configuration of the device monitor 114. Alternatively or additionally, the device monitor 114 may automatically determine the communication device name and/or the type of communication device by interacting with the communication device 112, interacting with another computer capable of providing communication device identity data, or accessing a communication device identity data store.

The user authentication data is data provided by the monitored client system 110 that may be used by the presence detection system 130 to verify that the received communication device status data was sent by the monitored client system 110 and not sent by an intervening third party. The user authentication data may be a password or other user-specified key that may be associated with the user of the monitored client system 110. The user authentication data may be included with every transmission of communication device status data or may be included periodically with transmissions of communication device status data. Alternatively or additionally, the user of the monitored client system 110 may log into a login server 134 of the presence detection system 130 to establish a direct connection using an encrypted key that may be used to authenticate the communication device status data sent by the monitored client system 110. The direct connection may be configured in a manner similar to that used by many instant messaging (IM) systems.

The device monitor 114 includes a communications interface (not shown) configured to send communication device status data in the form of digital communications to the presence detection system 130 over network 140. The digital communications may include instant messages (IMs), e-mails, and/or other messages or files including audio data, video data, general binary data, or text data (e.g., text encoded in the American Standard Code for Information Interchange (ASCII) format).

The device monitor 114 may detect the state of the communication device 112 and send the corresponding communication device status data to the presence detection system 130 at regular intervals (e.g., every 5 seconds). Alternatively or additionally, the device monitor 114 may detect the state of the communication device 112 and only send the corresponding communication device status data when the state of the communication device 112 changes (i.e., no data is sent if the state of the communication device has not changed). The device monitor 114 may, nevertheless, send communication device status data to the presence detection system 130 periodically even if no change in device state has occurred to prevent the presence detection system 130 from automatically changing the device state of the communication device 112 to "not connected to the network" because of lack of communication device status updates (as discussed below).

For some types of communication devices, such as personal computers and PDAs, the device monitor 114 may only send a communication device status update to the presence detection system 130 if the state of the communication device has changed to a new state and has remained in the new state for a predetermined amount of time. For example, a personal computer may be considered to be "in use" if the user has interacted with the user interface at least one time in a several minute interval. Thus, the device monitor 114 does not send communication device status data indicating the personal computer is not being used when a user stops typing on the keyboard for less than the defined several minute interval. As mentioned before, the device monitor 114 may, nevertheless, send communication device status data to the presence detection system 130 periodically even if no change in device state has occurred to prevent the presence detection system 130 from automatically changing the device state of the communication device 112 to "not connected to the network."

The monitoring client system 120 is configured to exchange digital communications with the presence detection system 130 and to receive, process, and display user communication availability data and/or communication device status data corresponding to one or more users of monitored client systems 110. The monitoring client system 120 is configured to enable a monitoring user to identify users of monitored client systems 110 to be monitored. As such, a list of users whose activities will be monitored ("an inferred presence list") may be established by a monitoring user in a manner that is similar to a buddy list of an instant messaging system, where the inferred presence list provides communication device status and user communication availability data for its members in addition or as an alternative to data regarding online status or availability to communicate over a single communication program or type. The monitoring client system 120 includes a user interface that enables a monitoring user to modify the inferred presence list and to perceive user communication availability and/or communication device status data corresponding to user identifiers included in the inferred presence list.

In some implementations, the monitoring client system 120 is also a monitored client system 110. In other words, a user of a client system may be monitoring other users of other client systems while simultaneously being monitored by others.

The monitoring client system 120 may be implemented by, for example, a general-purpose computer, a personal computer, a special purpose computer, a workstation, a server, a device, a component, or other equipment or some combination thereof capable of responding to and executing instructions in a defined manner. The monitoring client system 120 may receive instructions from, for example, a software application, a program, a piece of code, a device, a computer, a computer system, or a combination thereof, which independently or collectively direct operations, as described herein. The instructions may be embodied permanently or temporarily in any type of machine, component, equipment, storage medium, or propagated signal that is capable of being delivered to the monitoring client system 120.

The presence detection system 130 is a computer system that includes the login server 132, a presence server 134, and a customer profile data store 136. The login server 132 is configured to enable a user of the monitoring client system 120 to access the presence detection system 130 by providing access information through a registration process or otherwise. The access information may include, for example, a user identifier and a password. Once logged in, the monitoring client system 120 establishes a connection with the presence server 134 over network 140. In one particular implementation example, the login server 132 employs a hashing technique on the access information to identify a particular presence server 134 for use during the monitoring user's session. The login server 132 provides the monitoring client system 120 with the IP address of the particular presence server 134, gives the monitoring client system 120 an encrypted key (i.e., a cookie), and breaks the connection. The monitoring client system 120 then uses the IP address to establish a connection to the particular presence server 134 over network 140, and obtains access to that presence server 134.

In another implementation, the user of the monitored client system 110 also logs into the presence detection system 130 by providing access information. A direct connection between the presence server 134 and the monitored client system 110 is set up using an encrypted key and serves to authenticate the communication device status information sent by the monitored client system 110 to the presence server 134.

The presence server 134 is configured to regularly or periodically receive communication device status data in the form of digital communications from one or more device monitors 114, as discussed below in reference to FIG. 2. The presence server 134 is configured to store the received communication device status data in a communication device status record, access presence rules from a presence rule record, and process the communication device status data in accordance with the presence rules to determine user communication availability data. The presence server 134 is configured to store the user communication availability data in a user communication availability record. The communication device status, the presence rule, and the communication availability records may be stored in the customer profile data store 136 and may be indexed by the user identifiers. In another implementation, the communication device status, the presence rule, and the user communication availability records are replaced by one or more records containing the same or equivalent data.

Table 1 shows the information stored in an exemplary communication device status record corresponding to a user named "Joe" with a user identity "JoeRenner3."

TABLE 1

| Communication Device Identifier | Device type | Connected to network? | In use? |
| --- | --- | --- | --- |
| Phone-Office | Landline Phone | 1 | 0 |
| Computer-Office | Personal Comp | 1 | 1 |
| JoesCellPhone | Wireless Phone | 0 | 0 |
| Computer-Home | Personal Comp | 1 | 0 |
| JoesPDA | PDA | 0 | 0 |

Joe has five communication devices: (1) a landline phone identified as "Phone-Office" located in Joe's office; (2) a personal computer identified as "Computer-Office" located in Joe's office; (3) a wireless phone identified as "JoesCellPhone;" (4) a personal computer identified as "Computer-Home" located in Joe's residence; and (5) a PDA identified as "JoesPDA."

As shown in Table 1, the communication devices 112 identified as "Phone-Office," "Computer-Office," and "Computer-Home" are connected to the network 140 and are thus able to receive digital communications sent over the network 140. The communication devices 112 identified as "JoesCellPhone" and "JoesPDA" are not connected to the network 140 and are not able to receive digital communications sent over the network 140. Joe is currently using the communication device 112 identified as "Computer-Office."

The presence server 134 updates the communication device status records to correspond to the latest communication device status data received from the device monitors 114. As discussed previously, the presence server 134 may be configured such that a lack of communication device status data for a given communication device 112 for a predetermined interval of time (e.g., 5 minutes), causes the presence server 134 to update the communication device status record to indicate that the given communication device 112 is not connected to the network. Thus, if the device monitor 114 tracking the status of the communication device 112 stops sending information because, for example, the device monitor 114 is unexpectedly disconnected from the network 140, the presence server 134 considers the associated communication device 112 also disconnected from the network 140 and updates the communication device status record accordingly. The presence server 134 changes the communication device status record to indicate that the communication device 112 is once again connected to the network if the presence server 134 receives new communication device status data from the device monitor 114 indicating that the communication device 112 is once again connected to the network 140.

Subsequent or concurrent to updating the communication device status record, the presence server 134 is configured to access an associated presence rule record (i.e., a record corresponding to the monitored user identifier included in the received communication device status data) to retrieve a set of presence rules tailored to the monitored user. Presence rules are divided into three types of rules: (1) direct presence rules that relate a communication device state of a first communication device directly to the availability of the user to perceive communications over the first communication device; (2) inferred presence rules that relate the communication device state of the first communication device to the availability of the user to perceive communications over one or more second communication devices associated with the first communication device; and (3) presence monitoring rules that change the user communication availability and/or the communication device status based on the identity of the monitoring user.

The presence rules may be specified by the user of the monitored client system 110 and stored in the presence rule record during registration or system setup. The presence server 134 may dynamically request from the monitored user updates to the presence monitoring rules stored in the presence rule record when a heretofore unknown monitoring user requests communication device status or user communication availability data corresponding to the monitored user. Presence rules also may be inferred or auto-configured from data or knowledge obtained from the user or otherwise regarding the physical proximity between the communication devices 112. Presence rules also may be inferred or auto-configured from communication device usage patterns of the user.

For example, Joe may set up a direct presence rule stating that if he is using the phone identified as "Phone-Office", then he is unavailable to perceive communications over the phone identified as "Phone-Office." (i.e., he is using the phone and is unable to receive calls through that phone). Joe also may set up a direct presence rule stating that he is available to perceive communications over his wireless phone identified as "JoesCellphone" and his personal computers identified as "Computer-Office" and "Computer-Home" even when he is using those devices.

Continuing with the example, Joe also may set up an inferred presence rule stating that if he is using the personal computer identified as "Computer-Office", then he is able to perceive communications over the landline phone identified as "Phone-Office" provided the landline phone identified as "Phone-Office" is connected to the network 140 and not in use. This inferred presence rule infers that Joe is present in his office when he is using the personal computer located in his office and, thus, Joe is able to perceive communications over the phone located in his office. Joe also may set up an inferred presence rule stating that, when using the wireless phone identified as "JoesCellPhone," he is able to perceive communications over the PDA identified as "JoesPDA" provided that the PDA is connected to the network 140. This inferred presence rule infers that Joe has his PDA on his person when Joe has his wireless phone on his person (as indicated by his use of the wireless phone), which may be inherently true when Joe uses an integrated cell phone PDA. Inferred presence rules typically relate the availability of a user to perceive communications over communication devices 112 that are in close physical proximity to each other or are otherwise physically or communicatively linked to each other.

Joe also may set up presence monitoring rules that prevent certain users of monitoring client systems 120 from being provided with Joe's availability to perceive communications over some or all of his communication devices 112 and/or prevent certain users of monitoring client systems 120 from receiving communication device status information corresponding to some or all of his communication devices 112. For example, Joe's friends may be allowed to monitor the device status of and his availability to perceive communications over his wireless phone ("JoesCellPhone"), his PDA ("JoesPDA"), and his personal computer at his residence ("Computer-Home"), but may not be allowed to monitor the device status of and his availability to perceive communications over his landline phone at his office ("Phone-Office") or his personal computer at his office ("Computer-Office"). Joe's coworkers or clients, on the other hand, may be allowed to monitor the device status of and his availability to perceive communications over his wireless phone, his PDA, his personal computer at his office, and his phone at his office, while being prevented from monitoring the device status of and his availability to perceive communications over his personal computer at his residence. Presence monitoring rules may be used in this manner to adjust Joe's privacy level in accordance with the identity of the monitoring user.

Joe also may set up presence monitoring rules that change the direct and inferred presence rules based on the identity of the monitoring user. For example, Joe may always want his wife to be able to reach him, regardless of whether he is using a given communication device. Thus, Joe may set up a presence monitoring rule that results in any communication device 112 that he is using, including his office phone, being shown as available to perceive communications from his wife. For all other monitoring users, his office phone is shown as unavailable when he is using it.

The presence server 134 is configured to create and/or update a user communication availability record by applying the direct presence rules and inferred presence rules stored in the presence rule record to the updated communication device status record. For example, applying the direct presence rules and inferred presence rules specified by Joe to the communication device status record of Table 1 results in the user communication availability record shown in Table 2:

TABLE 2

| Communication Device Identifier | Device type | Available to perceive Communications? |
|---|---|---|
| Phone-Office | Landline Phone | 1 |
| Computer-Office | Personal Comp | 1 |
| JoesCellPhone | Wireless Phone | 0 |
| Computer-Home | Personal Comp | 0 |
| JoesPDA | PDA | 0 |

As shown in Table 2, Joe is available to perceive communications over the phone in his office and over the computer in his office. The computer in his residence is connected to the network 140 (see Table 1) but is currently not being used by Joe. According to his presence rules, therefore, Joe is not available to perceive communications over his home computer.

The presence server 134 is configured to periodically update the communication device status records and user communication availability records as communication device status data updates are received. The presence server 134 provides monitoring client systems 120 with access to the updated data in the records, for instance, as discussed below with respect to FIG. 3.

The customer profile data store 136 includes one or more data storage devices configured to store information related to customers receiving presence monitoring services from the presence detection system 130 (i.e., users of monitored client systems 110 and users of monitoring client systems 120). The information includes user communication availability records, communication device status records, presence rule records, monitoring records (discussed below), customer service information, authentication information, and other information collected during registration (e.g., e-mail address, phone number, and home address).

The network 140 is configured to enable direct or indirect communications between the monitored client system 110, the monitoring client system 120, and the presence detection system 130. Examples of a network 140 include the Internet, Wide Area Networks (WANs), Local Area Networks (LANs), analog or digital wired and wireless telephone networks (e.g., Public Switched Telephone Network (PSTN), Integrated Services Digital Network (ISDN), and Digital Subscriber Line (xDSL)), radio, television, cable, satellite, and/or any other delivery or tunneling mechanism for carrying data.

Figure 2:
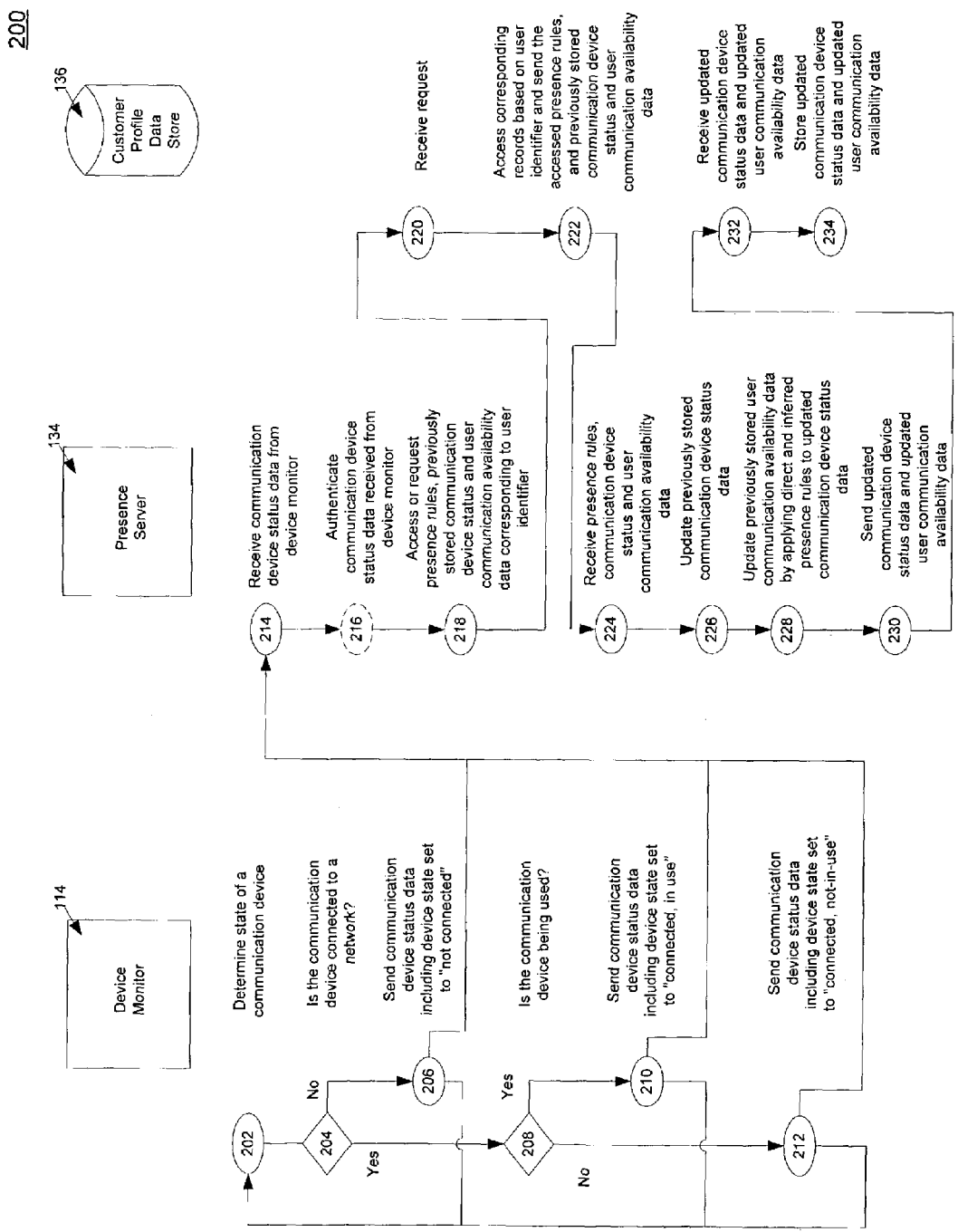
FIG. 2 is a flow chart of a process for updating user communication availability data and communication device status data.

FIG. 2 shows a process 200 for updating the communication device status and the user communication availability of a monitored user. For convenience, the process 200 shown in FIG. 2 references particular componentry described with respect to FIG. 1. However, similar methodologies may be applied in other implementations where different componentry is used to define the structure of the system, or where the functionality is distributed differently among the components shown in FIG. 1.

The device monitor 114 determines the state of a communication device 112 (202). As discussed previously, the determination of the state may occur at regular or periodic intervals and may or may not be prompted by a change in the state of the communication device 112. In another implementation, the monitored user logs into the presence detection system 130 prior to the device monitor 114 determining communication device status and/or sending communication device status data to the presence server 134.

The device monitor 114 determines whether the communication device 112 is connected to the network 140 (204). If the communication device 112 is not connected to the network 140, then the device monitor 114 sends to the presence server 134 communication device status data including the state of the communication device set to "not connected," the user identifier, the communication device identifier, and, in some implementations, user authentication data (206).

In another implementation, the device monitor 114 is integrated with the communication device 112 or otherwise configured such that the device monitor 114 also is not connected to the network 140 when the communication device 112 is not connected to the network 140. In this implementation, the device monitor 114 is not able to send communication device status data indicating that the state of the communication device 112 is not connected. However, if the communication device 112 is connected to the network 140 and then disconnects from the network 140, the presence detection system 130 may determine that a disconnect has occurred between the communication device 112 and the network 140 by receiving from the device monitor 114 a "not connected" signal prior to the communication device 112 (and, therefore, the device monitor 114) being disconnected from network 140 or by detecting an interruption in the transmission of regular communication device status updates as discussed previously.

If the communication device 112 is connected to the network 140, the device monitor 114 determines whether the communication device 112 is being used (208). If the communication device 112 is connected to the network and is being used, then the device monitor 114 sends to the presence server 134 communication device status data including the state of the communication device set to "connected, in use," the user identifier, the communication device identifier, and, in some implementations, user authentication data (210). If the communication device 112 is connected to the network 140 but not being used, then the device monitor 114 sends communication device status data including the state of the communication device set to "connected, not in use," the user identifier, the communication device identifier, and, in some implementations, user authentication data (212).

The presence server 134 receives the communication device status data from the device monitor 114 (214). The presence server 134 optionally authenticates the communication device status data by comparing the authentication data (e.g., the password or other user-specified key) included in the received communication device status data to the authentication data stored under the received user identifier in the customer profile data store 136 (216). If the received authentication data matches or otherwise properly relates to the stored authentication data corresponding to the received user identifier, the communication device status data is considered authentic. If no match or proper relation is found, the communication device status data is not considered authentic and is discarded. In another implementation, the user of the monitored client system 114 logs into the presence detection system 130 and the monitored client system 114 is provided with an encrypted key to connect to the presence server 134. Communications sent by the monitored client system 114 over the connection set up using the encrypted key may be considered authentic.

The presence server 134 accesses or sends a request to the customer profile data store for presence rules and previously stored communication device status and user communication availability data corresponding to the received user identifier (218). The customer profile data store 136 receives the request (220) and accesses the corresponding data records based on the user identifier. As discussed previously, the customer profile data store 136 may access a communication device status record, a user communication availability record, and a presence rule record corresponding to the user identifier. Alternatively, the customer profile data store 136 may access a single data record containing all of the data or multiple other data records collectively containing all of the data. After accessing the data records, the customer profile data store 136 sends to the presence server 134, or otherwise makes accessible, the presence rules and the previously stored communication device status and user communication availability data (222). In another implementation, the data stored in the customer profile data store 136 is stored locally at the presence server 134.

The presence server 134 receives or otherwise accesses the presence rules and previously stored communication device status and user communication availability data from the customer profile data store 136 (224). In another implementation, the presence server 134 receives or accesses the data from the customer profile data store 136 as the data is needed in subsequent operations, rather than receiving or accessing the data all at once.

The presence server 134 updates the previously stored communication device status data accessed or received from the customer profile data store 136 based on the communication device status data received from the device monitor 114 (226). After updating the previously stored communication device status data, the presence server 134 updates the previously stored user communication availability data by applying the direct presence rules and inferred presence rules to the updated communication device status data (228).

The presence server 134 sends to the customer profile data store 136, or otherwise makes accessible, the updated communication device status data and the updated user communication availability data (230). In another implementation, the presence server 134 sends the updated data to the customer profile data store 136 (or otherwise makes the updated data accessible) as the updated data is calculated, rather than sending the updated data or making the updated data accessible all at once.

The customer profile data store 136 receives or otherwise accesses the updated communication device status data and the updated user communication availability data from the presence server 134 (232). The customer profile data store 136 stores the updated communication device status data in the communication device status record corresponding to the user identifier and stores the updated user communication availability data in a user communication availability record corresponding to the user identifier (234).

Concurrent, subsequent, or prior to sending or otherwise making the updated data accessible to the customer profile data store 136, the presence detection system 130 may push the updated communication device status and/or the updated user communication availability data to one or more monitoring client systems 120. In order to determine which monitoring client systems 120 should receive the data, the presence server 134 accesses a monitoring record corresponding to the monitored user identifier. The monitoring record includes user identifiers of monitoring users that have requested monitoring of the monitored user identifier. The monitoring records typically are stored in the customer profile data store 136 and are indexed by monitored user identifier.

The presence server 134 accesses connection information corresponding to the included monitoring user identifiers from, for example, the monitoring record or from monitoring user configuration or login files (stored in the customer profile data store 136). The presence server 134 uses the connection information to push the updated communication device status data and/or the updated user communication availability data to the monitoring client systems 120 corresponding to the monitoring user identifiers included in the monitoring record.

Figure 3:
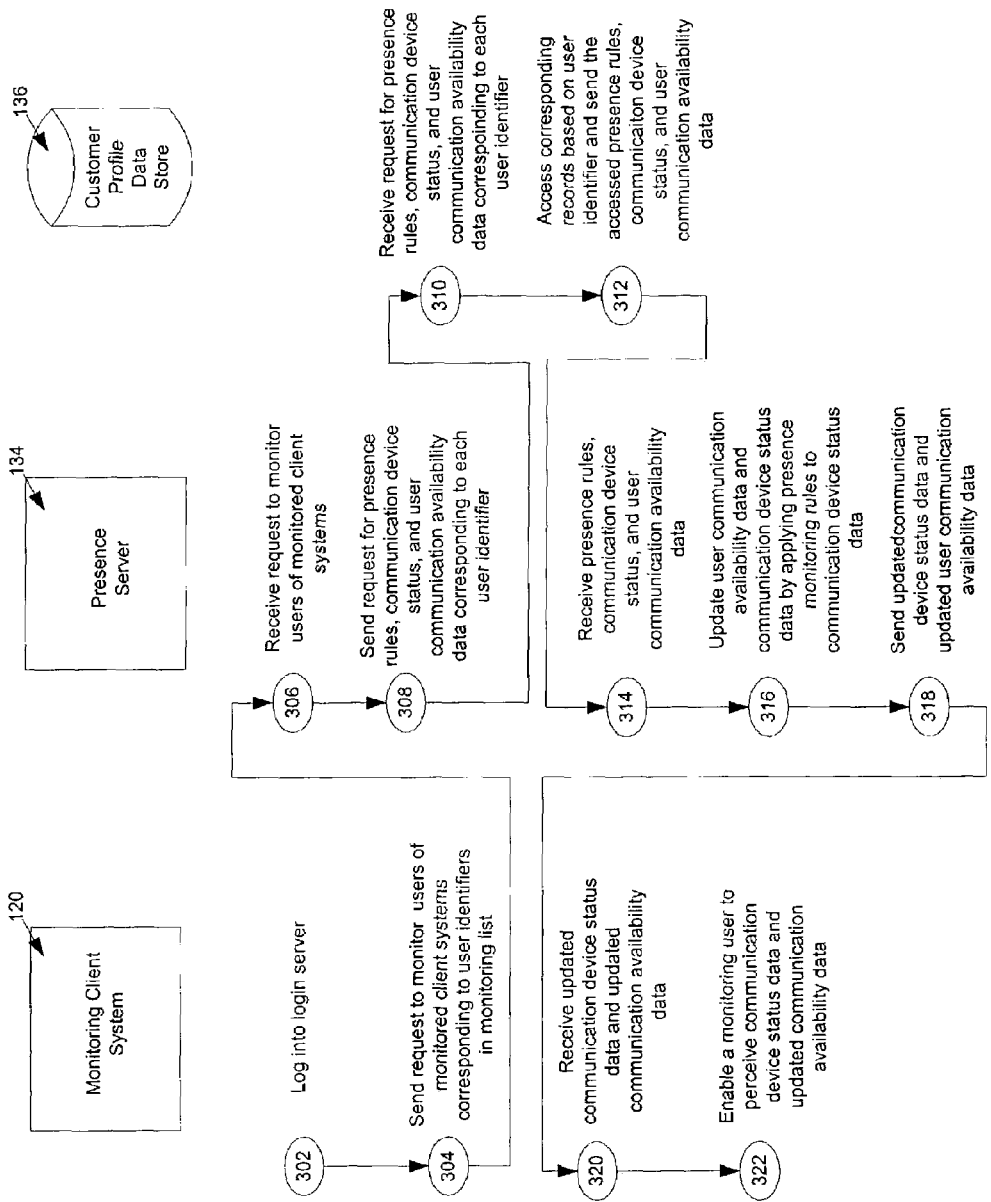
FIG. 3 is a flow chart of a process for monitoring communication device status and user communication availability.

FIG. 3 shows a process 300 for monitoring communication device status and user communication availability for one or more monitored users. For convenience, the process 300 shown in FIG. 3 references particular componentry described with respect to FIG. 1. However, similar methodologies may be applied in other implementations where different componentry is used to define the structure of the system, or where the functionality is distributed differently among the components shown in FIG. 1.

A user of a monitoring client system 120 logs into the presence detection system 130 by providing access information to the login server 132 (302). After logging in, the monitoring client system 120 sends a request to monitor users of monitored client systems 110 corresponding to the user identifiers in the inferred presence list of the monitoring user (304). The request includes the user identifier of the monitoring user.

The presence server 134 receives the request (306) and, if the presence detection system 130 provides server-side pushing of user communication availability and/or communication device status data, the presence server 134 stores the monitoring user identifier in one or more monitoring records. The monitoring user identifier is stored in each monitoring record that corresponds to a monitored user identifier in the inferred presence list. In some implementations, the connection information of the monitoring client system 120 also is stored in the monitoring records.

The presence server 134 sends a request to the customer profile data store 136 for presence rules, communication device status, and user communication availability data corresponding to each received monitored user identifier (308). The customer profile data store 136 receives the request (310) and accesses the corresponding data records based on the monitored user identifiers. After accessing the data records, the customer profile data store sends or otherwise makes accessible to the presence server 134 the presence rules, the communication device status, and the user communication availability data for each monitored user identifier (312).

The presence server 134 receives or otherwise accesses from the customer profile data store 136 the presence rules, the communication device status, and the user communication availability data for each monitored user identifier (314). The presence server 134 updates the user communication availability data and/or the communication device status data for each monitored user identifier by applying the appropriate presence monitoring rules to the communication device status data for each monitored user identifier (316).

The presence server 134 sends or otherwise makes accessible to the monitoring client system 120 the updated communication device status data and/or the updated user communication availability data for each monitored user identifier (318). The monitoring client system 120 receives or otherwise accesses the updated communication device status data and/or the updated user communication availability data (320) and enables the monitoring user to perceive the updated communication device status data and/or the updated user communication availability data for each monitored user identifier (322).

The monitoring client system 120 may pull communication device status data and/or user communication availability data from the presence detection system 130 by periodically sending a request for or receiving a pushed download of updated data for each monitored user identifier in the inferred presence list. The request may be processed in the same manner as discussed above.

Alternatively or additionally, the presence server 134 may push communication device status and/or user communication availability data to the monitoring client system 120 by accessing the monitoring record corresponding to the monitored user identifier after operation 230 of process 200 and, as discussed previously, pushing the updated data to each monitoring client system 120 corresponding to each monitoring user identifier stored in the monitoring record. The communication device status and/or user communication availability data may be pushed anytime the communication device status corresponding to a monitored user, which is included on the inferred presence list, changes. When the user of the monitoring client system 120 logs off, the monitoring client system 120 directs or otherwise instructs the presence server 134 to remove the monitoring user identifier from all monitoring records.

The monitoring client system 120 may send an acknowledgement communication to the presence server 134 each time the monitoring client system 120 receives updated communication device status and/or user communication availability data. If no acknowledgment communication is received by the presence server 134 after a predetermined interval of time, the presence server 134 may resend the updated data. If no acknowledgement communication is received after repeatedly sending the updated data, the presence server 134 infers that the monitoring system 120 has been disconnected from the network 140 and removes the monitoring user identifier corresponding to the monitoring client system 120 from all monitoring records.

If the user of the monitoring client system 130 changes the user identifiers on the user's inferred presence list, the monitoring client system 130 sends a new request to the presence server 134 with the new list of monitored user identifiers. If the presence detection system 130 provides server-side pushing of updated data to the monitoring client system 130, the presence server 134 adds any new monitoring user identifiers to the corresponding monitoring records and deletes any monitoring user identifiers that were on the old inferred presence list but are no longer on the new updated inferred presence list from the corresponding monitoring records.

Figure 4:
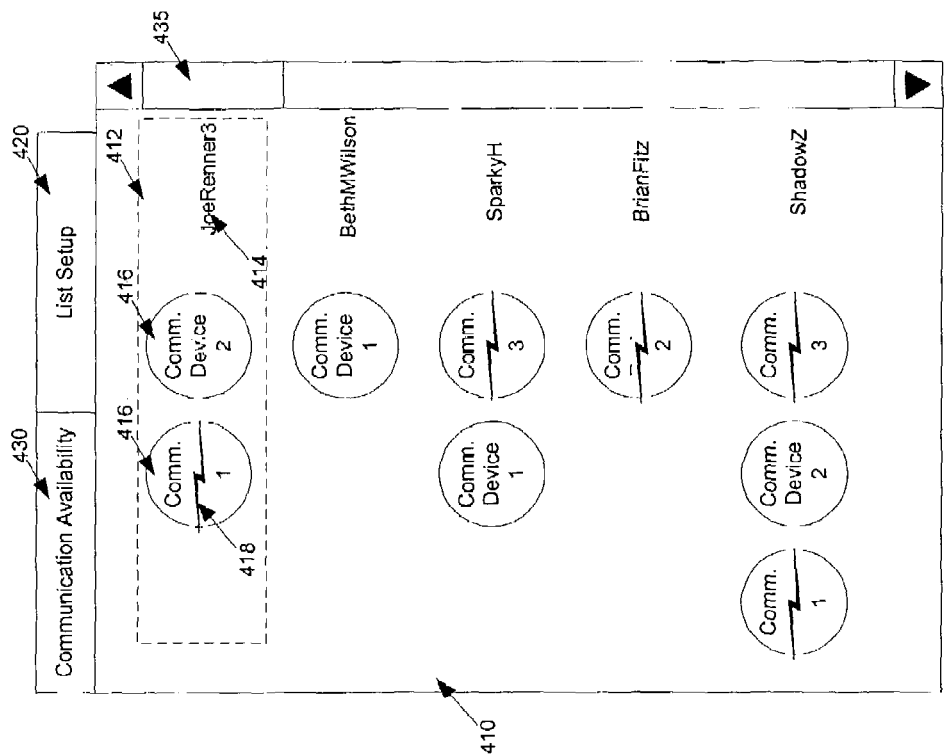
FIGS. 4–7 are block diagrams of user interfaces for monitoring communication device status and user communication availability.

FIG. 4 shows an exemplary user interface 400 of a monitoring client system 120 for monitoring the communication device status and user communication availability of one or more monitored users. The user interface 400 includes a monitoring window 410, a communication availability tab 420, and a list setup tab 430. The monitoring window 410 may be provided with horizontal or vertical scroll bars 435 or other means to allow the window to be sized to fit on different displays while providing access to elements that do not appear in the window.

The monitoring window 410 includes an entry 412 for each monitored user. The entry 412 includes a user identifier 414 corresponding to the monitored user associated with the entry and one or more communication device symbols 416 corresponding to communication devices 112. In the implementation shown in FIG. 4, a device symbol 416 is only shown in the entry 412 if the monitored user is currently available to perceive communications through the corresponding communication device 112. The device symbols 416 may be graphical icons or elements that represent the type of communication device and also may include the communication device name (e.g., "Computer-Home") or a proxy (e.g., "Computer #2" or "Home Computer").

The status of each communication device 112 may be portrayed by a status symbol 418 overlaid, placed in close proximity to, or otherwise visually associated with the device symbol 416. The status symbol 418 may be a graphical icon that represents the state of the communication device 112. For example, FIG. 4 shows that JoeRenner3 is available to perceive communications over the first communication device and the second communication device and is currently using the first communication device (i.e., the status symbol 418 in this particular case signifying use of the "Comm. Device 1" communication device 112, and necessarily indicating that "Comm. Device 2" is deemed to be available for communications through inference). Similarly, FIG. 4 shows that BethMWilson is available to perceive communications over the first communication device; SparkyH is available to perceive communications over the first communication device and the third communication device and is currently using the third communication device; BrianFitz is available to perceive communications over the second communication device and is currently using the second communication device; and ShadowZ is available to perceive communications over the first, second, and third communication devices and is currently using both the first and the third communication devices.

Figure 5:
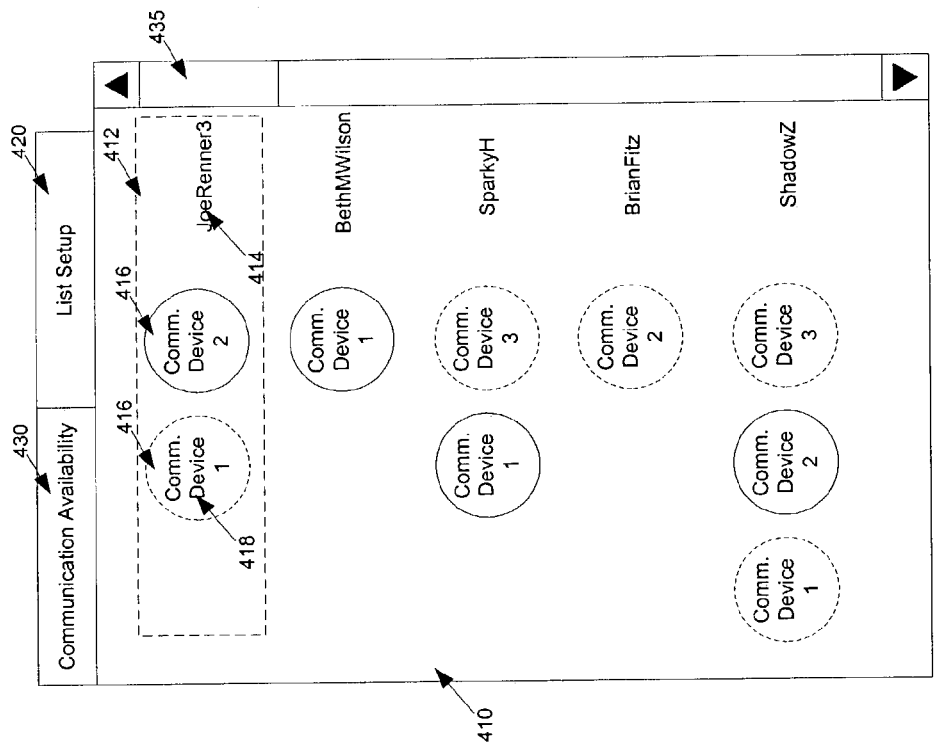

In another implementation, the status of the communication device 112 may be portrayed by graying out, changing the color, or otherwise visually modifying the device symbol 416 in addition or as an alternative to using the status symbol 418. For instance, FIG. 5 shows a user interface 500 corresponding to the user interface 400 but depicting use of a communication device 112 through a graying out of the corresponding device symbol 416 rather than through use of an overlaid status symbol 418.

Figure 6:
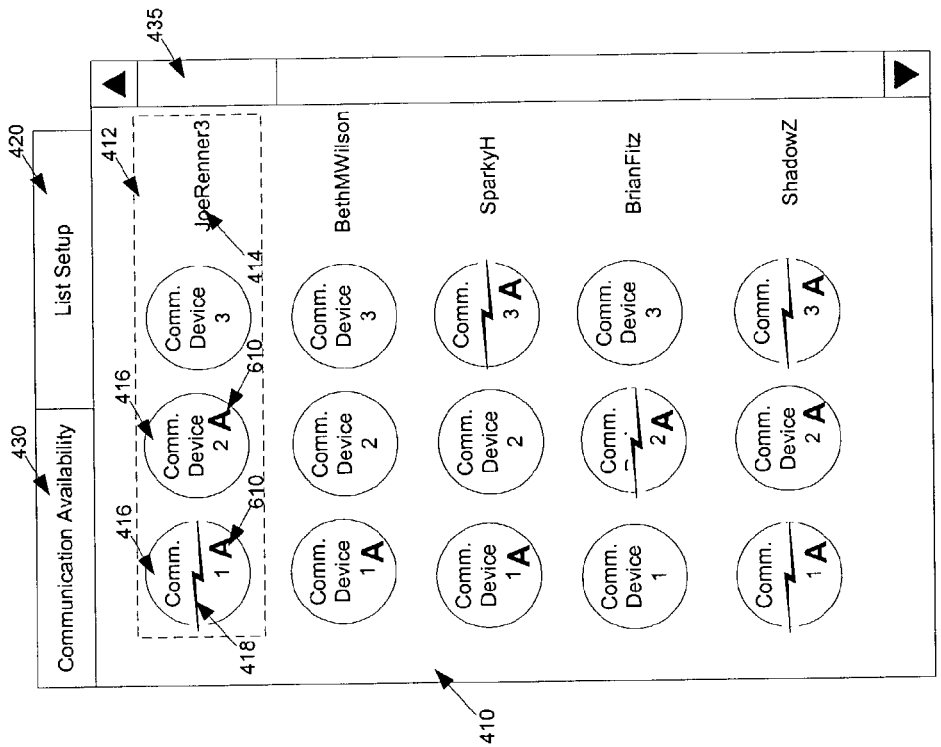

In yet another implementation, the entry 412 includes a device symbol 416 for all communication devices 112 that the monitored user has included in his communication device status record and has allowed the monitoring user to view (i.e., the presence monitoring rules allow the monitoring user to see the status and/or user communication availability related to the device). In this implementation, unlike the implementations depicted in FIGS. 4 and 5, a device symbol 416 is shown regardless of the availability of the monitored user to receive communications through the corresponding communication device 112. Instead, the availability to perceive communications is indicated in the same manner as device state by using an additional symbol, modifying the device symbol 416, or modifying the state symbol 418 to depict user communication availability. For example, as shown in the user interface 600 in FIG. 6, an additional availability symbol 610 may be shown overlaid on (or in close proximity to) the device symbol 416 and is only shown when the monitored user is available to perceive communications over the associated communication device 112. FIG. 6 shows the same user identifiers and corresponding availability and communication device status information as depicted in FIGS. 4 and 5.

Figure 7:
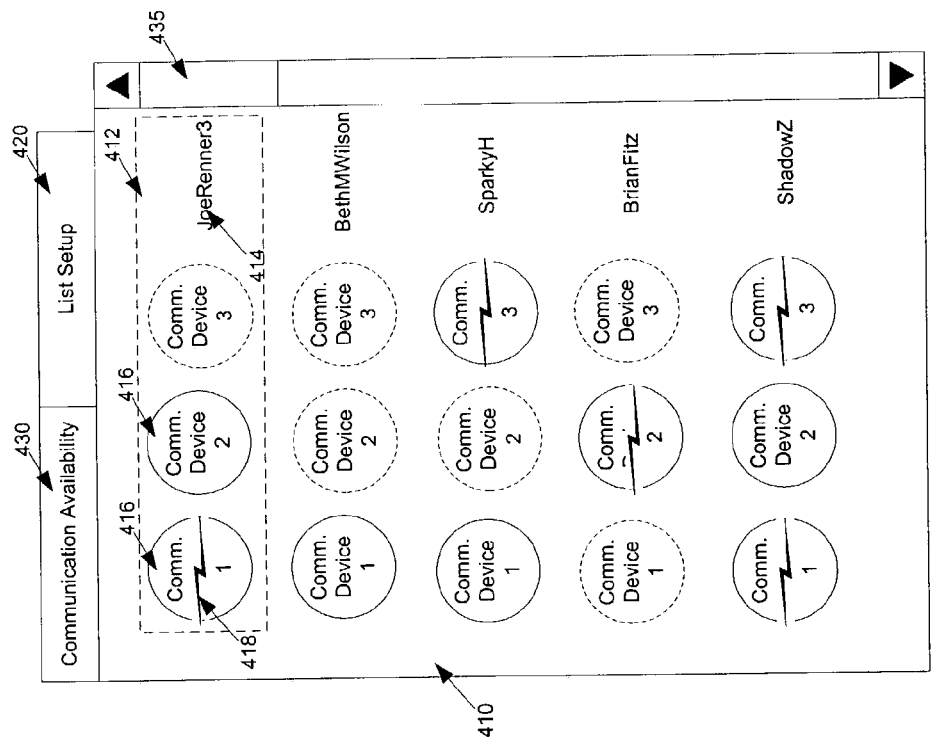

Additionally or alternatively, the availability to perceive communications also may be shown by modifying the device symbol 416 and/or the state symbol 418 to gray out, change color, or otherwise visually change. For example, as shown in the user interface 700 in FIG. 7, the device symbols 416 may be grayed out if the user is not able to perceive communications over the associated communication device 112. FIG. 7 shows the same user identifiers and corresponding availability and communication device status information as depicted in FIGS. 4–6.

The list setup tab 420 may be selected by the user to access a list setup interface (not shown) that allows the user to create or modify the inferred presence list. The list setup interface may be a separate pop-up window or may replace the monitoring window 410. The list setup interface allows the user to create, modify, and save the inferred presence list. After modifying or creating the inferred presence list, the user may select the communication availability tab 430 to update the monitoring window 410 to correspond to the new inferred presence list and to close the pop-up window or otherwise return to viewing the monitoring window 410.

Figure 8:
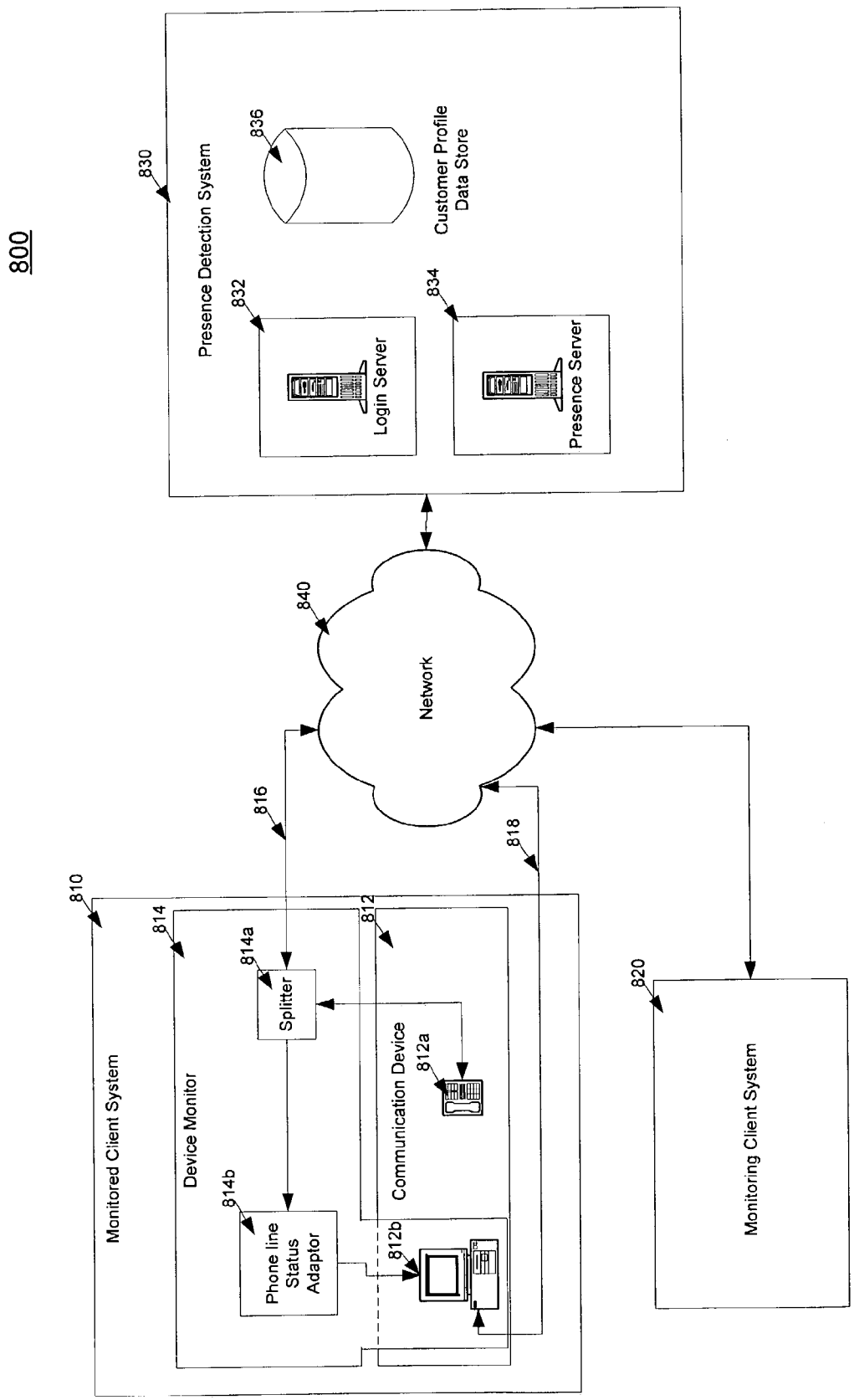
FIG. 8 is a block diagram of a communications system for monitoring the status of a personal computer and a landline phone and monitoring user availability to perceive communications over the personal computer and the landline phone.

Referring to FIG. 8, a communications system 800 for monitoring the status of a personal computer and a landline phone and monitoring user availability to perceive communications over the personal computer and the landline phone includes a monitored client system 810, a monitoring client system 820, a presence detection system 830, and a network 840. Examples of each element within the system 800 of FIG. 8 are described broadly above with respect to FIG. 1. In particular, the monitored client system 810, the monitoring client system 820, the presence detection system 830, and the network 840 typically have attributes comparable to those described with respect to the monitored client system 110, the monitoring client system 120, the presence detection system 130, and the network 140 of FIG. 1, respectively.

The presence detection system 830 includes a login server 832, a presence server 834, and a customer profile data store 836. The monitored client system 810 includes a device monitor 814 and communication devices 812. The communication devices 812 include a landline phone 812*a* and a personal computer 812*b*. The landline phone 812*a* is connected to the network 840 by a phone line 816. The personal computer 812*b* is connected to the network 840 by a data line 818.

The device monitor 814 includes a splitter 814*a*, a phone line status adaptor 814*b*, and device monitoring software installed in the personal computer 812*b*. The splitter 814*a* splits the phone line signal to allow the phone line signal to be monitored by the phone line status adaptor 814*b*. The phone line status adaptor 814*b* is a hardware device that electrically monitors the phone line status and sends status information to the personal computer 812*b*. The voltage levels of the phone line may be correlated to device states. For example, the DC voltage between ring and tip conductors of a phone line exceeds 40 volts when the line is on-hook (i.e., connected to the network and not being used). In a typical telephone system in the United States, when a telephone connected to the phone line goes off-hook (i.e., connected to the network and being used), the voltage between ring and tip conductors decreases to less than 10 volts DC. The phone line status adaptor 814*b* may detect these voltage levels and pass the corresponding phone line state as a digital signal to the personal computer 812*b*. A phone line status adaptor 814*b* may be implemented using, for example, a Model 2001 ANI-232. Single Line Caller ID Adaptor manufactured by Rochelle Communications, Inc.

If the phone line 816 is disconnected from the wall and, thus, the landline phone 812*a* is not connected to the network 840, then the voltage of the phone line is floating or otherwise not being driven to a predetermined voltage. The phone line status adaptor 814*b* may relay this floating voltage to the personal computer 812*b* to be interpreted by the device monitoring software installed in the personal computer 812*b*. Alternatively, the phone line status adaptor 814*b* may detect this floating voltage and send a digital signal to the personal computer 812*b* that indicates that the landline phone 812*a* is not connected to the network 840.

The device monitoring software installed in the personal computer 812*b* relates the digital signals received from the phone line status adaptor 814*b* to the device state of the landline phone 812*a* (i.e., not connected to the network, connected to the network and in use, and connected to the network and not in use). The device monitoring software also periodically or continuously determines whether the personal computer 812*b* is connected to the network 840 over data line 818 and whether a user is currently interacting with the user interface of the personal computer (e.g., typing on the keyboard or moving a mouse). The monitoring software directs the personal computer 812*b* to send communication device status data regularly or periodically to the presence server 834 of the presence detection system 830. The personal computer 812*b* sends the communication device status data over data line 818 and network 830.

In another implementation, the phone line 816 is run directly from the network 840 into the personal computer 812b for processing. The phone line signal is sent to the landline phone 812b by the personal computer 812a over a patch cord (not shown) between the personal computer 812b and the landline phone 812a. The personal computer 812b performs the function of the phone line status adaptor 814b and eliminates the need of a splitter 814a by monitoring the phone line signal while allowing the phone line signal to pass through the personal computer 812b unchanged and return to the landline phone 812a intact.

Figure 9:
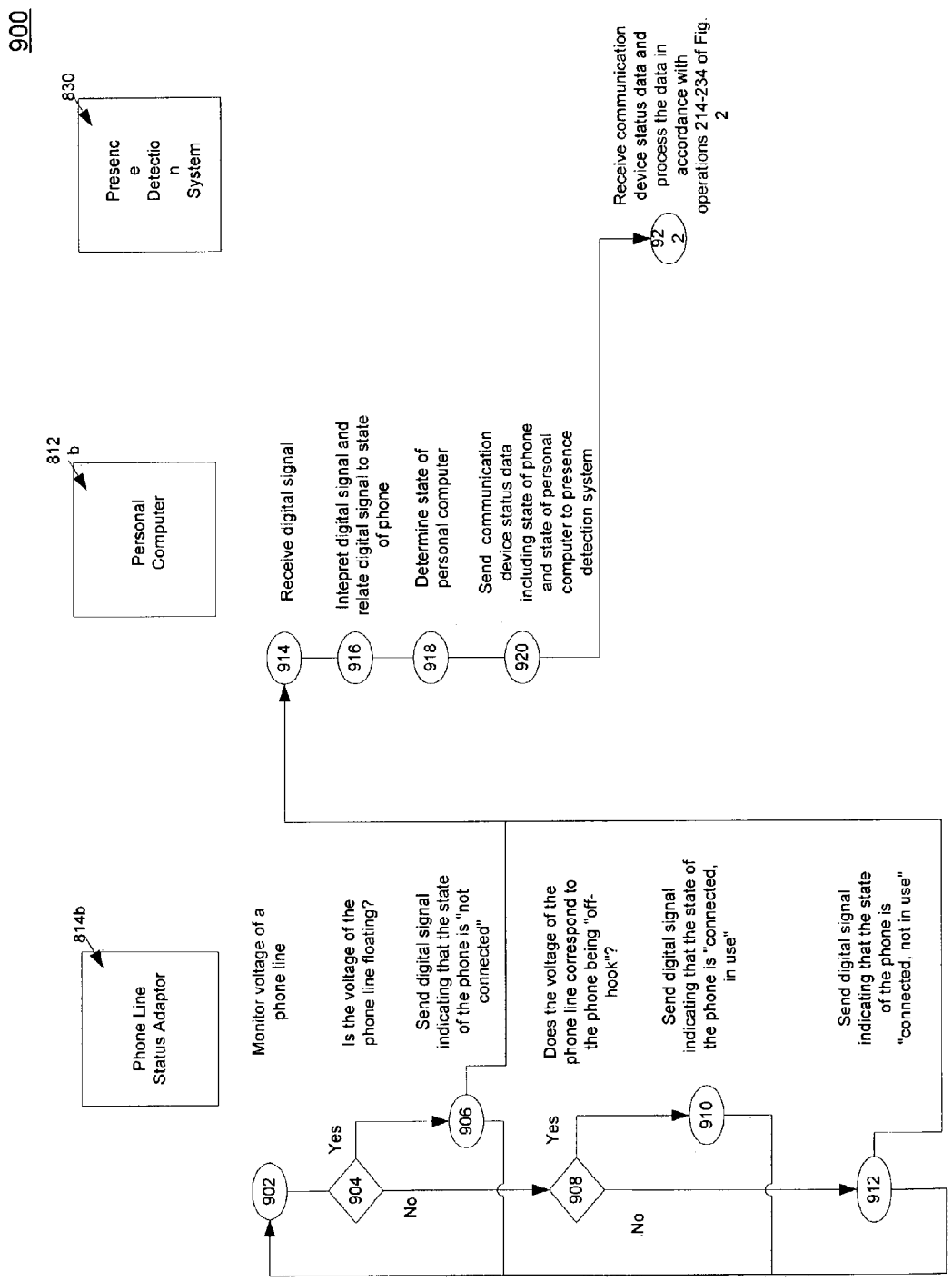
FIG. 9 is a flow chart of a process for monitoring the status of a landline phone and a personal computer and monitoring the availability of a user to perceive communications over the landline phone and the personal computer.
Figure 10:
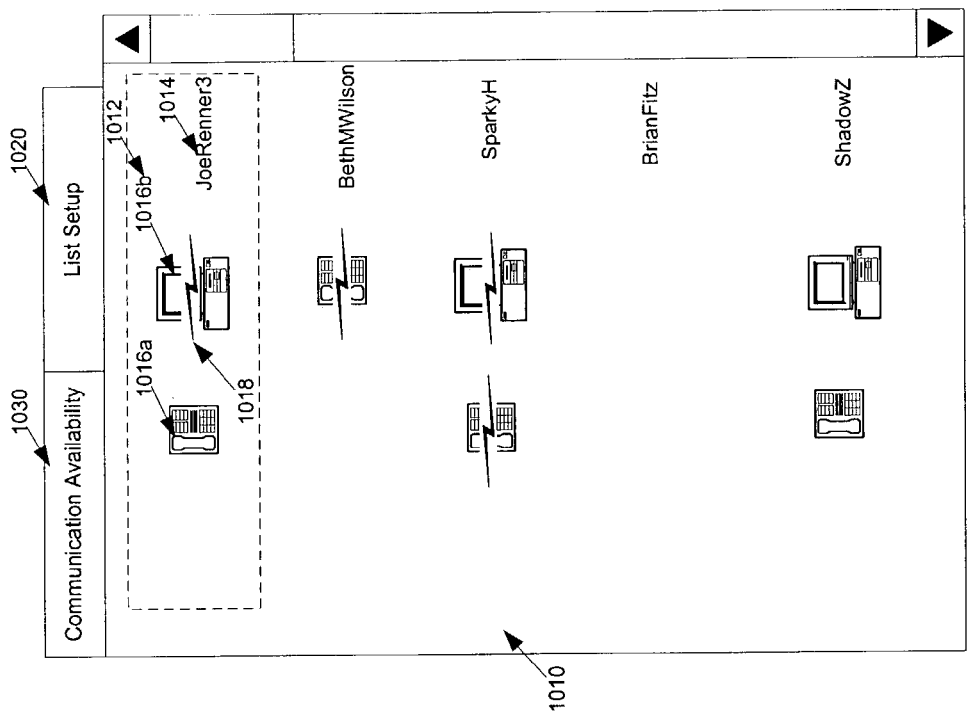
FIG. 10 is a block diagram of a user interface that is a particular implementation of the user interface of FIG. 4 directed to monitoring personal computer and landline phone status and user communication availability.

FIG. 9 shows a process 900 for monitoring the status of a landline phone and a personal computer and monitoring the availability of a user to perceive communications over the landline phone and the personal computer. For convenience, the process 900 shown in FIG. 9 references particular componentry described with respect to FIG. 8. However, similar methodologies may be applied in other implementations where different componentry is used to define the structure of the system, or where the functionality is distributed differently among the components shown by FIG. 8.

The phone line status adaptor 814b monitors the voltage of phone line 816 (902) and determines whether the landline phone 812b is connected to the network 840 (904). If the voltage of the phone line is floating or otherwise not being driven to a particular voltage level (e.g., not being driven to a voltage less than 10 volts DC or greater than 40 volts DC), then the phone line status adaptor 814b sends a digital signal to the personal computer 812b indicating that the state of the landline phone 812a is not connected to the network 840 (906).

If the voltage of the phone line is not floating, the phone line status adaptor 814b determines whether the voltage of the phone line corresponds to the phone being "off-hook" (e.g., determines whether the voltage of the phone line is less than 10 volts DC) (908). If the voltage of the phone line corresponds to the phone being "off-hook," the phone line status adaptor 814b sends a digital signal to the personal computer 812b indicating that the state of the landline phone 812a is "connected, in use" (910) If the voltage of the phone line does not correspond to the phone being "off-hook," the phone line status adaptor 814b sends a digital signal to the personal computer 812b indicating that the state of the landline phone 812a is "connected, not in use" (912).

In another implementation, the phone line adaptor 814b indicates that the state of the landline phone 812a is "connected, not in use" if the voltage of the phone line corresponds to the phone being "on-hook" (e.g., the voltage of the phone line exceeds 40 volts DC). If the voltage of the phone line is not floating but does not correspond to the phone being "on-hook" or "off-hook" (i.e., the voltage of the phone line is being driven to a voltage not less than 10 volts DC nor greater than 40 volts DC), then the phone line adaptor may either send a digital signal to the personal computer 812b indicating that the state of the landline phone 812a is "not connected" or may send a digital signal indicating that the state of the landline phone 812a is "indeterminate."

The personal computer 812b receives the digital signal (914) and interprets the digital signal to relate the digital signal to a state of the landline phone 812a (916). For example, if the digital signal is received by the personal computer 812b through a multi-pin connector, the digital signal is interpreted based on its voltage level and the pin or pins through which it is communicated.

Concurrent, prior, or subsequent to receiving the digital signal and/or interpreting and relating the digital signal to a state of the landline phone 812a, the personal computer 812b determines the state of the personal computer (i.e., determines if the personal computer is connected to the network 840 and if the personal computer is being used by a user) (918).

After the state of the landline phone 812a and the state of the personal computer 812b are determined, the personal computer 812b sends communication device status data to the presence detection system 830 over the data line 818 (920). The communication device status data includes the user identifier corresponding to the landline phone 812a, the user identifier corresponding to the personal computer 812b, the communication device identifier corresponding to the landline phone 812a, the communication device identifier corresponding to the personal computer 812b, the state of the landline phone 812a, and the state of the personal computer 812b. The communication device status data may optionally include authentication data. In another implementation, the personal computer 812b sends two separate communication device status data updates to the presence detection system 830, one corresponding to the landline phone 812a and one corresponding to the personal computer 812b.

The presence detection system 830 receives the communication device status data from the personal computer 812b and processes the data in accordance with operations 214–234 shown in FIG. 2 (922). A monitoring client system 820 may monitor the landline phone 812a and the personal computer 812b in accordance with process 300 shown in FIG. 3.

FIG. 7 shows an exemplary user interface 1000 that is a particular implementation of the user interface 400 of FIG. 4 directed to monitoring personal computer and landline phone device status and user communication availability. The user interface 1000 includes a monitoring window 1010, a communication availability tab 1020, and a list setup tab 1030. Examples of each element of the user interface 1000 of FIG. 7 are described broadly above with respect to FIG. 4. In particular, the monitoring window 1010, the communication availability tab 1020, and the list setup tab 1030 typically have attributes comparable to those described with respect to the monitoring window 410, the communication availability tab 420, and the list setup tab 430 of FIG. 4, respectively.

The monitoring window 1010 includes an entry 1012 for each monitored user. The entry 1012 includes a user identifier 1014 corresponding to the monitored user associated with the entry and a phone icon 1016a and/or a personal computer icon 1016b. In this particular implementation, no communication device name is displayed next to, on, or near the icons 1016a and 1016b.

Icon 1016a is shown in entry 1012 if the user associated with the entry 1012 is available to perceive communications over the landline phone 812a. Icon 1016b is shown in entry 1012 if the user associated with the entry is available to perceive communications over the personal computer 812b. If a user is unavailable to perceive communications over the landline phone 812a or the personal computer 812b, the entry 1012 corresponding to that user is not shown in the monitoring window 1010. Alternatively, the entry 1012 may be shown but without icons 1016a and 1016b displayed (e.g., the entry corresponding to user identifier "BrianFitz").

A status symbol 1018 is used to indicate the state of the phone and the state of the personal computer. If the status symbol 1018 is overlaid on graphical icon 1016a, then the user is using the landline phone 812a but is still available to perceive communications over the landline phone 812a. If the status symbol is absent (i.e., not overlaid on graphical icon 1016a), then the user is not using the landline phone 812a and is available to perceive communications over the landline phone 812a. Similarly, the status symbol 1018 may be overlaid or not overlaid on the icon 1016b to indicate when the personal computer is in use or not in use, respectively. Accordingly, the entry 1012 corresponding to the user identity "JoeRenner3" indicates that Joe is available to perceive communications over both his landline phone 812a and his personal computer 812b and is currently using his personal computer 812a.

The systems and methods described are equally applicable to monitoring the communication availability of entities in general. The communication devices may be used, for example, by computers, and the presence rules and the inferred presence lists may be set up in an automated fashion by the monitoring computers to monitor the communication availability of other computers.

In some implementations, data exchanges between the monitoring client system 120 and the presence server 134 and between the presence server 134 and the customer profile data store 136 may occur through unprompted pushing of data rather than through responses to issued requests.

The presence detection system 130 may infer presence based on the state of other devices that are not communication devices and not connected to network 140. For example, a device monitor 114 may be used to monitor the state of a calculator in Joe's home office. When the calculator is in use, a presence rule infers that Joe is present in his office and, therefore, available to perceive communications over the office phone (identified as "Phone-Office") and/or the office computer (identified as "Computer-Office"). In another example, a device monitor 114 may be connected to a light switch in the office. When the light switch is on, a presence rule infers that Joe is present in his office and, therefore, available to perceive communications over the office phone and/or the office computer.

Accordingly, other implementations are within the scope of the following claims.

What is claimed is:

1. A method to monitor user availability to perceive communications received across a network, the method comprising:
   determining the existence of activity at a first communication device;
   accessing a presence rule record storing presence rule data relating the determined existence of activity at the first communication device to an availability of an intended recipient to perceive communications using a second communication device;
   applying presence rule data to the determined existence of activity to assess the availability of the intended recipient to perceive communications using the second communication device; and
   informing other entities of the assessed availability of the intended recipient to perceive communications using the second communication device.

2. The method of claim 1, wherein the first communication device or the second communication device includes one of a personal computer, a personal digital assistant, a landline phone, and a wireless phone.

3. The method of claim 1, wherein the other entities comprise other users.

4. The method of claim 1, wherein determining the existence of activity comprises determining the state of the first communication device from among a set of device states.

5. The method of claim 4, wherein the set of device states includes the first communication device being connected to the network and in use and the first communication device being connected to the network and not in use.

6. The method of claim 4, wherein the first communication device comprises a landline phone and determining the state of the landline phone comprises determining the state based on a voltage signal of a phone line.

7. The method of claim 6, wherein determining the state of the landline phone from among a set of device states comprises determining the state to be the landline phone connected to the network and in use by the first user if the voltage signal corresponds to the landline phone being off-hook.

8. The method of claim 6, wherein determining the state of the landline phone from among a set of device states comprises determining the state to be the landline phone connected to the network and not in use by the first user if the voltage signal corresponds to the landline phone being on-hook.

9. The method of claim 5, wherein the first communication device being connected to the network and in use comprises the first communication device being connected to the network and interaction with a user interface of the first communication device.

10. The method of claim 5, wherein the first communication device being connected to the network and in use comprises the first communication device being connected to the network and the intended recipient communicating with other entities using the first communication device.

11. The method of claim 9, wherein the interaction with the user interface of the first communication device comprises depression or selection of keys or buttons associated with elements in the user interface.

12. The method of claim 9, wherein the interaction with the user interface of the first communication device comprises interaction with a portion of the user interface related to communications.

13. The method of claim 1, wherein applying presence rule data comprises relating the state of the first communication device to the availability of the intended recipient to perceive communications using the first communication device.

14. The method of claim 13, further comprising informing other entities of the assessed availability of the first communication device to accommodate communications perceivable by the intended recipient.

15. The method of claim 1, wherein the second communication device is physically or communicatively linked to the first communication device.

16. The method of claim 1, wherein the second communication device is in close physical proximity to the first communication device.

17. The method of claim 1, wherein the presence rule data includes data specified by the intended recipient relating the state of the first communication device to the availability of the intended recipient to perceive communications using a second communication device.

18. The method of claim 1, wherein the presence rule data includes data inferred based on knowledge related to the physical proximity between the first communication device and the second communication device.

19. The method of claim 1, wherein the presence rule data includes data inferred based on communication device usage patterns of the intended recipient.

20. The method of claim 1, wherein the presence rule data includes data used to change the availability of the intended recipient to perceive communications from another entity based on the identity of the other entity.

21. A communications system comprising:
    a presence server configured to:

receive from a device monitor data related to the existence of activity at a first communication device;

access a presence rule record storing presence rule data relating the received data to the availability of an intended recipient to perceive communications using a second communication device;

apply presence rule data to the received data to assess the availability of the intended recipient to perceive communications using the second communication device; and inform other entities of the assessed availability of the intended recipient to perceive communications using the second communication device.

22. The system of claim 21, wherein the presence server is further configured to send the assessed availability to a monitoring client system.

23. The system of claim 21, wherein the first communication device or second communication device includes one of a personal computer, a personal digital assistant, a landline phone, and a wireless phone.

24. The system of claim 21, wherein the received data is data related to a state of the first communication device that is determined by the device monitor from among a set of device states.

25. The system of claim 24, wherein the set of device states includes the first communication device being connected to the network and in use and the first communication device being connected to the network and not in use.

26. The system of claim 24, wherein the first communication device comprises a landline phone and the received data is data that is determined by the device monitor based on a voltage signal of a phone line.

27. The system of claim 24, wherein the presence rule data include rules that relate a state of the first communication device to the availability of the first user to perceive communications using the first communication device.

28. The system of claim 24, wherein the presence rule data include rules that change the availability of the first user to perceive communications from the second user based on the identity of the second user.

29. The system of claim 26, wherein the received data is data corresponding to the landline phone being connected to the network and in use if the voltage signal corresponds to the landline phone being off-hook.

30. The system of claim 26, wherein the received data is data corresponding to the landline phone being connected to the network and not in use if the voltage signal corresponds to the landline phone being on-hook.

31. The system of claim 25, wherein the first communication device being connected to the network and in use comprises the first communication device being connected to the network and interaction with a user interface of the first communication device.

32. The system of claim 25, wherein the first communication device being connected to the network and in use comprises the first communication device being connected to the network and the intended recipient communicating with other users using the first communication device.

33. The system of claim 31, wherein the interaction with the user interface of the first communication device comprises depression or selection of keys or buttons associated with elements in the user interface.

34. The system of claim 31, wherein the interaction with the user interface of the first communication device comprises interaction with a portion of the user interface related to communications.

35. The system of claim 21, wherein the second communication device is physically or communicatively linked to the first communication device.

36. The system of claim 35, wherein the second communication device is in close physical proximity to the first communication device.

37. A user interface comprising:

a first interface element structured and arranged to identify a user of interest; and a second interface element structured and arranged to enable perception of the availability of the user of interest to perceive communications using a second communication device based on a determined existence of activity at a first communication device.

38. The user interface of claim 37, wherein the first interface element is structured and arranged to identify a user of interest specified by a party to whom the user interface is provided.

39. The user interface of claim 37, wherein the first interface element comprises text that identifies the user of interest.

40. The user interface of claim 37, wherein the second interface element comprises a set of graphical elements, each graphical element corresponding to a communication device.

41. The user interface of claim 40, wherein the set includes a graphical element corresponding to the second communication device.

42. The user interface of claim 41, wherein the set includes a graphical element corresponding to the first communication device.

43. The user interface of claim 40, wherein the set of graphical elements only includes a graphical element corresponding to communication devices over which the user of interest may perceive communications from the second user.

44. The user interface of claim 40, wherein each graphical element is visually distinguishable based on a state of the corresponding communication device.

45. The user interface of claim 40, wherein a subset of the set of graphical elements are graphically distinguishable from the set, the subset only including the graphical elements that correspond to the communication devices over which the user of interest may perceive communications from the second user.

46. The user interface of claim 40, wherein the set of graphical elements comprise icons corresponding to the type of communication device.

47. The user interface of claim 46, wherein the set of graphical elements include an icon corresponding to a landline phone.

48. The user interface of claim 46, wherein the set of graphical elements include an icon corresponding to a personal computer.

49. The user interface of claim 37, wherein the second interface element includes a first set of graphical elements, each element corresponding to a communication device and further includes one or more graphical elements selected from a second set of graphical elements, each element of the second set corresponding to a state of the one or more communication devices.

50. The user interface of claim 49, wherein the graphical elements of the second set are overlaid on the graphical elements of the first set to indicate the state of the communication device corresponding to each graphical element of the first set.

* * * * *